US007330580B2

(12) United States Patent
Weng et al.

(10) Patent No.: US 7,330,580 B2
(45) Date of Patent: Feb. 12, 2008

(54) SYSTEM AND METHOD FOR INSPECTING AN LCD PANEL

(75) Inventors: Yi-Feng Weng, Shenzhen (CN); Xiao-Guang Li, Shenzhen (CN); Xin Lu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 636 days.

(21) Appl. No.: 10/976,146

(22) Filed: Oct. 28, 2004

(65) Prior Publication Data

US 2005/0285617 A1 Dec. 29, 2005

(30) Foreign Application Priority Data

Jun. 25, 2004 (TW) .............................. 93118533 A

(51) Int. Cl.
*G06K 9/00* (2006.01)

(52) U.S. Cl. ....................................... 382/141; 382/144

(58) Field of Classification Search ................ 382/141, 382/143, 144–151; 356/237.1, 239.1, 239.2; 348/92, 125, 128, 761, 762, 766, 763; 349/141, 349/187

See application file for complete search history.

(56) References Cited

U.S. PATENT DOCUMENTS 5,400,135 A * 3/1995 Maeda .................... 356/239.1
6,630,996 B2 * 10/2003 Rao et al. ................ 356/237.5
6,720,791 B2 4/2004 Cheng et al. ............... 324/770
6,744,482 B2 * 6/2004 Matsumoto et al. ........ 349/141
6,757,047 B2 6/2004 Amano ....................... 349/349
6,809,809 B2 * 10/2004 Kinney et al. ........... 356/237.5
2002/0191138 A1 * 12/2002 Matsumoto et al. ........ 349/141
2004/0001177 A1 * 1/2004 Byun et al. ................. 349/187
2005/0122463 A1 * 6/2005 Byun et al. ................. 349/187

* cited by examiner

*Primary Examiner*—Brian Le
(74) *Attorney, Agent, or Firm*—Morris Manning Martin LLP; Tim Tingkang Xia, Esq.

(57) ABSTRACT

A system for inspecting a liquid crystal display (LCD) panel (10) includes a magnifier (11) for magnifying an image of the inspected LCD panel, a charge coupled device (CCD) camera (12) for capturing the magnified image of the inspected LCD panel, an image acquisition card (13) for converting analog signals of the magnified image into digital signals, and a computer (14). The computer is for obtaining color template intervals based on a statistical theory, rotating the magnified image when necessary, obtaining transverse mask codes and longitudinal mask codes of magnified image pixels, obtaining a color transverse mask code matrix of sub-pixels of the inspected LCD panel, and determining whether the sub-pixels of the inspected LCD panel are defective according to the color transverse mask matrix. A related method for inspecting an LCD is also provided.

18 Claims, 12 Drawing Sheets

SYSTEM AND METHOD FOR INSPECTING AN LCD PANEL

BACKGROUND OF THE INVENTION

1. Field of the Invention

The present invention relates to systems and methods for inspecting panels, and particularly to a system and method for inspecting liquid crystal display (LCD) panels.

2. Related Art of the Invention

With the merits of small volume and light weight, LCDs have the edge over conventional cathode ray tube (CRT) displays in the market for portable display devices and compact application displays. LCDs are being produced in increasingly larger volumes to meet the increasing demand. A typical LCD has a liquid crystal material sandwiched between an active plate and a ground plate. Polarizers, colorizing filters and spacers may also be included between the plates. During fabrication, many active panels may be formed on a single glass plate. In each area of the glass plate that is to form an active panel, pixel areas, drive lines, gate lines and drive elements are formed. Typically, thin-film transistors are used for the drive elements.

Because of the relative complexity of the active plate in comparison to the ground plate, most LCD defects can be traced to some form of defect in the active plate. When a defective active plate is detected, repair of the active plate or discarding of the entire LCD are both costly. Thus various tests have been developed for inspecting active plates alone, so that defective active plates can be identified and repaired or discarded at a relatively early stage of the fabrication process. A typical testing method is to connect an array tester to the signal lines and gate lines on the active plate. The array tester sequentially transmits predetermined signals to the signal lines or gate lines, then sequentially receives and analyzes the signals fed back by the signal lines or gate lines in order to locate the defective pixels. The array tester uses probe tips to contact the outer pin of each signal or gate line and transmit the predetermined signals to the signal or gate line. The signals fed back from the signal or gate line are then analyzed as current-voltage (IV) curves using components such as integrators. If any IV curve does not match a predefined standard, the existence of one or more defective pixels is determined. The defective pixels are subsequently identified using an apparatus such as an electron microscope.

However, the testing method described above has some limitations. To carry out the test, the probe tips must precisely contact the outer pin of the signal or gate line. When the active plate has a high resolution, the outer pins are densely arrayed. The apparatus controlling the probe tips to touch the outer pins must be highly precise, and the testing process must be meticulous and laborious. Furthermore, the higher pixel count in a larger LCD requires more testing time. Testing times can have a major effect on manufacturing costs. Good quality control includes short testing times with efficient testing, and can considerably improve yield. Accordingly, there is a need for a simple and convenient system and method for inspecting an LCD which can overcome the above-mentioned problems.

SUMMARY OF THE INVENTION

A main objective of the present invention is to provide a system and method which can efficiently perform inspection of an LCD panel.

To accomplish the above objective, a system for inspecting an LCD panel in accordance with a preferred embodiment of the present invention comprises a magnifier for magnifying an image of the inspected LCD panel, a charge coupled device (CCD) camera for capturing magnified the image of the inspected LCD panel, an image acquisition card for converting analog signals of the magnified image into digital signals, and a computer. The computer is for obtaining color template intervals based on a statistical theory, rotating the magnified image, obtaining transverse mask codes and longitudinal mask codes, obtaining a color transverse mask code matrix of sub-pixels of the inspected LCD panel, and determining whether the sub-pixels of the LCD panel are defective according to the color transverse mask matrix.

Further, the present invention provides a method for inspecting an LCD panel, the method comprising the steps of: (a) obtaining color template intervals; (b) processing a magnified image of an inspected LCD panel according to a slope; (c) obtaining transverse mask codes of image pixels of the processed image, according to the color template intervals and the color values; (d) obtaining longitudinal mask codes of image pixels of the processed image, according to the color template intervals and green color values of the image pixels; (e) trimming off four edges of the processed image; (f) obtaining a color transverse mask code matrix of sub-pixels of the inspected LCD panel, according to the color template intervals, the transverse mask codes and the longitudinal mask codes; (g) determining whether one or more color transverse mask codes “0” or “255” exist in the color transverse mask code matrix; and (h) making one or more corresponding sub-pixels of the inspected LCD panel, and regarding the one or more corresponding sub-pixels as defective.

Other objects, advantages and novel features of the present invention will be drawn from the following detailed description with reference to the attached drawings, in which:

BRIEF DESCRIPRTION OF THE DRAWINGS

DETAILED DESCRIPTION OF THE INVENTION

Figure 1:
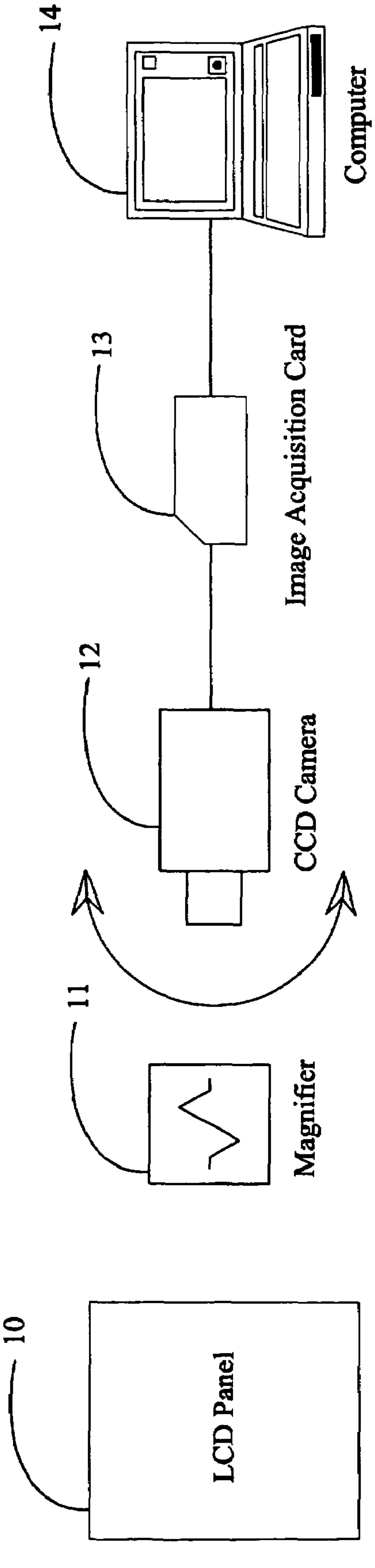
FIG. 1 is a schematic diagram of hardware infrastructure of a system for inspecting an LCD panel in accordance with the preferred embodiment of the present invention.

FIG. 1 is a schematic diagram of hardware infrastructure of a system for inspecting an LCD panel (hereinafter, "the system") in accordance with the preferred embodiment of the present invention. The system is connected to one or more LCD panels 10 to be inspected. For better illustrating the preferred embodiment, only one inspected LCD panel 10 is shown in FIG. 1 and described herein. The system comprises a magnifier 11, a charge coupled device (CCD) camera 12, an image acquisition card 13, and a computer 14. The magnifier 11 is for magnifying an image of the inspected LCD panel 10. The CCD camera 12 is for capturing the magnified image of the inspected LCD panel 10. The image acquisition card 13 is for converting analog signals of the magnified image into digital signals. The computer 14 comprises a central processing unit (CPU) and a memory (neither shown). The memory is for storing the digital signals. The CPU is for obtaining color template intervals, processing the magnified image, obtaining a color transverse mask code matrix of sub-pixels of the inspected LCD panel, and determining whether the color transverse mask code matrix includes abnormal codes.

Figure 2:
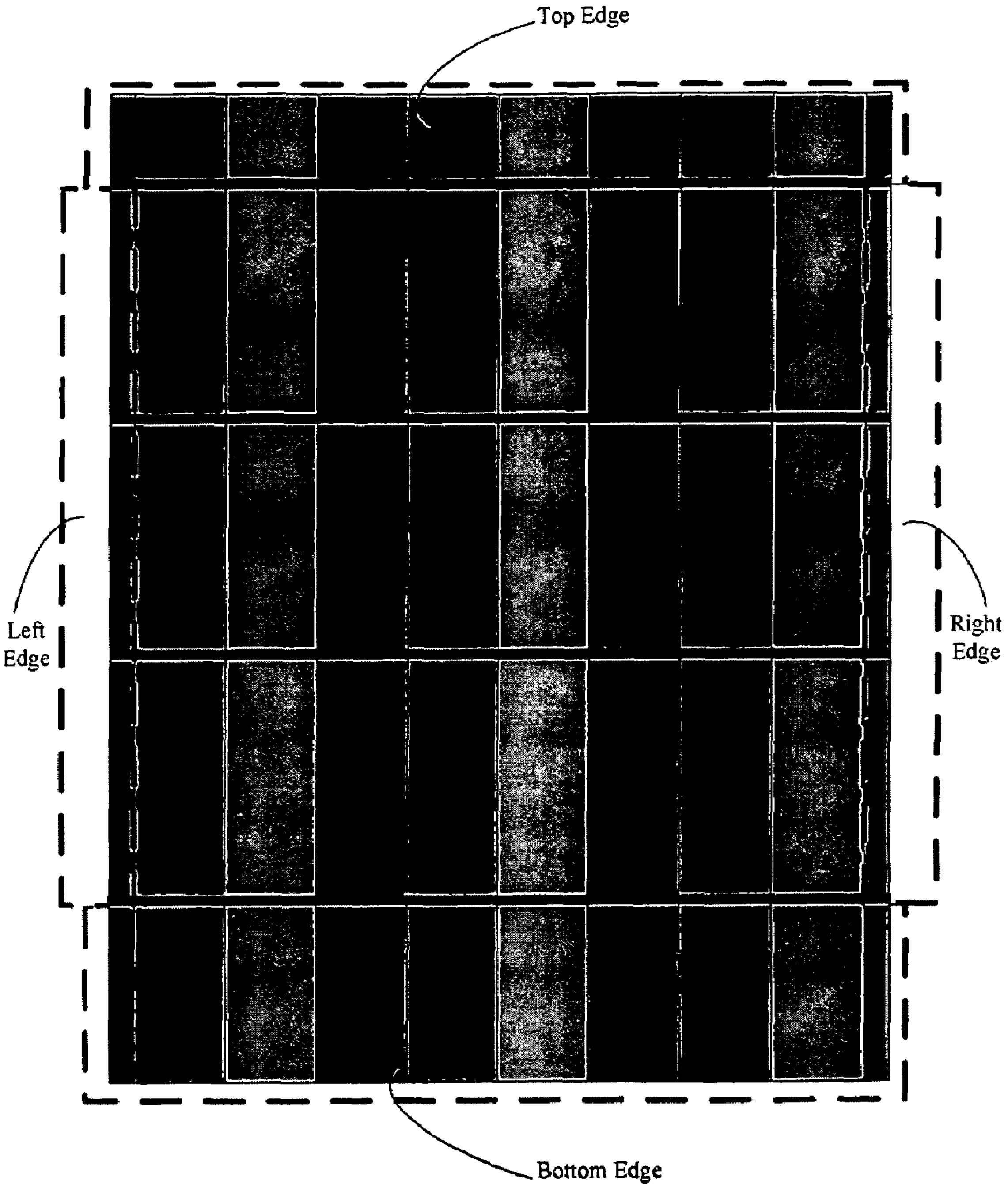
FIG. 2 illustrates a magnified image captured by a CCD camera of the system of FIG. 1.

FIG. 2 illustrates a magnified image captured by the CCD camera 12. The magnified image comprises four edges: a top edge, a bottom edge, a left edge, and a right edge. The four edges may be faulty due to factors such as vibrations that may occur during the magnified image capturing process. Therefore, the four edges should be trimmed off first, and do not need to be coded in the following procedures. The magnified image shows RGB (red, green, blue) colors in a sequential array according to an RGB transverse distribution rule. That is, a column of red is followed by a column of green, which is followed by a column of blue, which is followed by a column of red, etc.

Figure 3:
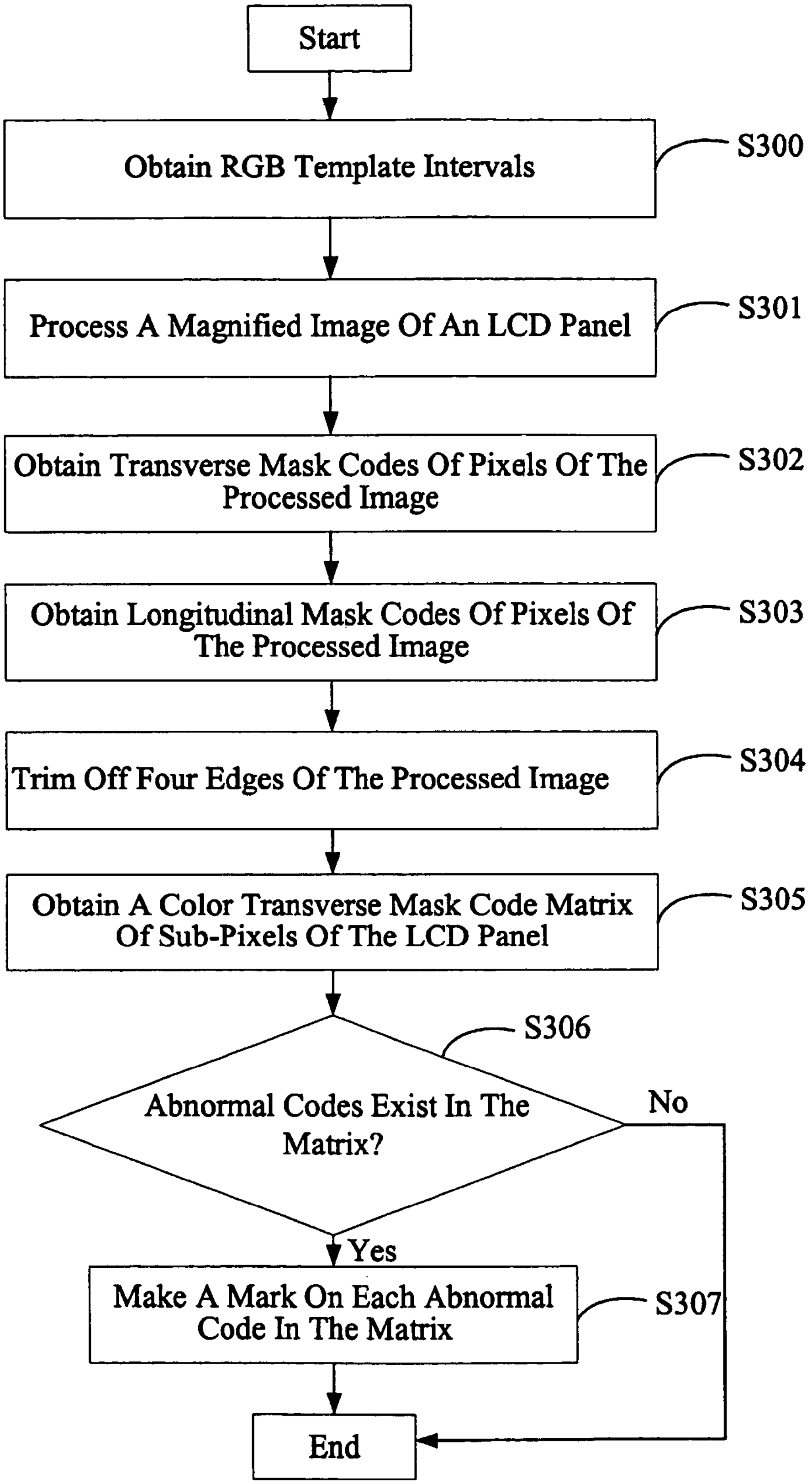
FIG. 3 is a flowchart of a preferred method for implementing the system of FIG. 1.

FIG. 3 is a flowchart of a preferred method for implementing the system. In step S300, the computer 14 acquires magnified images of a number of unflawed LCD panels 10, and analyzes the magnified images to obtain R, G, B template intervals of a typical unflawed LCD panel 10 based on a statistical theory. In step S301, the computer 14 obtains and processes a magnified image of an inspected LCD panel 10. In step S302, the computer 14 codes the processed image, and obtains transverse mask codes of pixels of the processed image. In step S303, the computer 14 obtains longitudinal mask codes of pixels of the processed image. That is, the computer 14 distinguishes black edges from the processed image. In step S304, the computer 14 trims off four edges of the processed image, in order to obtain a clean, complete RGB image. In step S305, the computer 14 obtains a color transverse mask code matrix of sub-pixels of the inspected LCD panel 10. In step S306, the computer 14 determines whether the color transverse mask code matrix includes abnormal codes. That is, the CPU 14 determines whether the color transverse mask code matrix includes any code "0" or code "255." In step S307, the computer 14 makes a mark on (i.e., flags) each abnormal code, if the color transverse mask code matrix includes any abnormal code.

Figure 4:
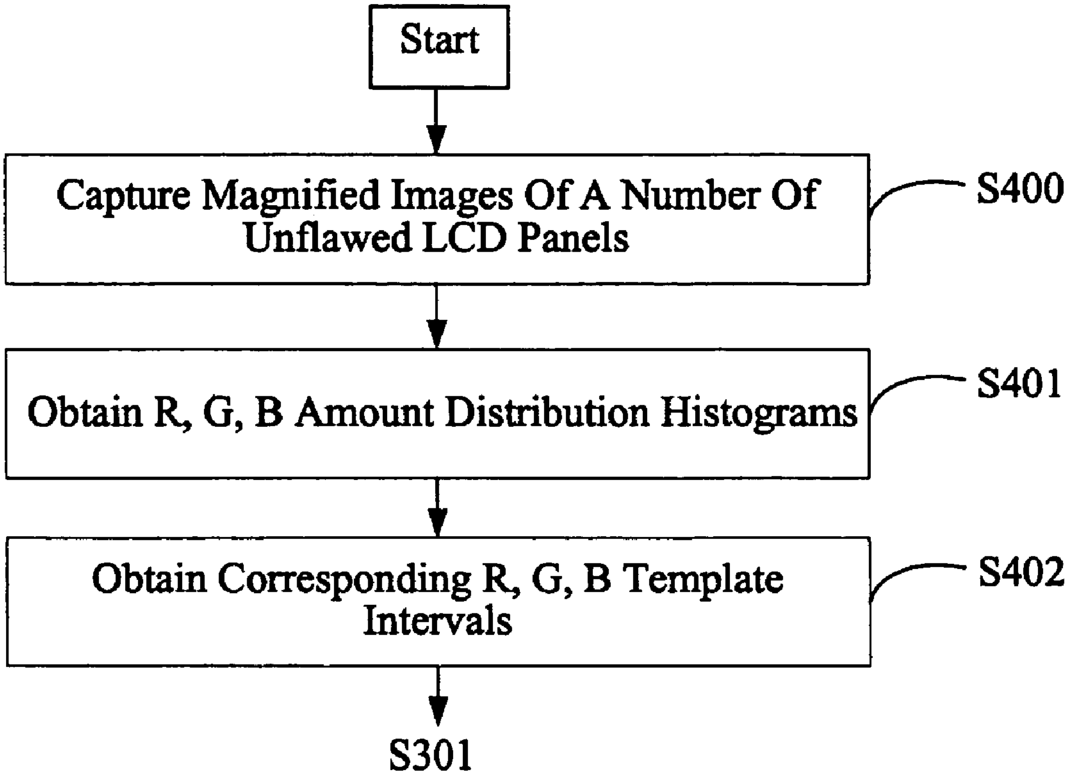
FIG. 4 is a flowchart of implementing a first step of FIG. 3, namely obtaining RGB template intervals.

FIG. 4 is a flowchart of implementing step S300 of FIG. 3, namely obtaining R, G, B template intervals of a typical unflawed LCD panel 10. In step S400, the CCD camera 12 captures magnified images of a number of unflawed LCD panels 10 through the magnifier 11. The image acquisition card 13 converts analog signals of the magnified images to digital signals, and the computer 14 stores the magnified images in the memory. Each magnified image comprises a plurality of image pixels. Each image pixel comprises three sub-pixels, each with a color value. The three sub-pixels are a red sub-pixel, a green sub-pixel, and a blue sub-pixel. Each color value ranges between 0 and 255, and represents a corresponding effect on the display color of the image pixel. In the present invention, the image pixel displays the color of a sub-pixel which has the greatest color value among the three sub-pixels. In step S401, the computer 14 counts an amount of each color value of each sub-pixel, and obtains an amount distribution histogram of all color values of each sub-pixel. In step S402, the computer 14 selects a color value with the greatest amount from the amount distribution histogram of a sub-pixel (for example, the red sub-pixel), and sets the color value as a central point (symbolically depicted as "$X_0$"). Then, the computer 14 selects a color value not being zero from the leftmost point of the distribution histogram, and a color value not being zero from the rightmost point of the amount distribution histogram. The computer 14 sets the left color value as a left point designated as "$X_1$," and the right color value as a right point designated as "$X_2$." The computer 14 reads an $X'_1$ and an $X'_2$ from the color values of the red sub-pixel respectively from the intervals of $X_0$ to $X_1$ and $X_0$ to $X_2$, until a ratio of $(X_0-X'_1)$ to $(X'_2-X_0)$ equals p % of a ratio of $(X_0-X_1)$ to $(X_2-X_0)$. In this way, the computer 14 obtains an interval $(X'_1, X'_2)$, and regards the interval $(X'_1, X'_2)$ as a red template interval. The "p" is a variable and can be adjusted according to particular inspection requirements. By implementing the same procedures as for step S401 and step S402 described above, the computer 14 similarly obtains a green template interval and a blue template interval.

Figure 5:
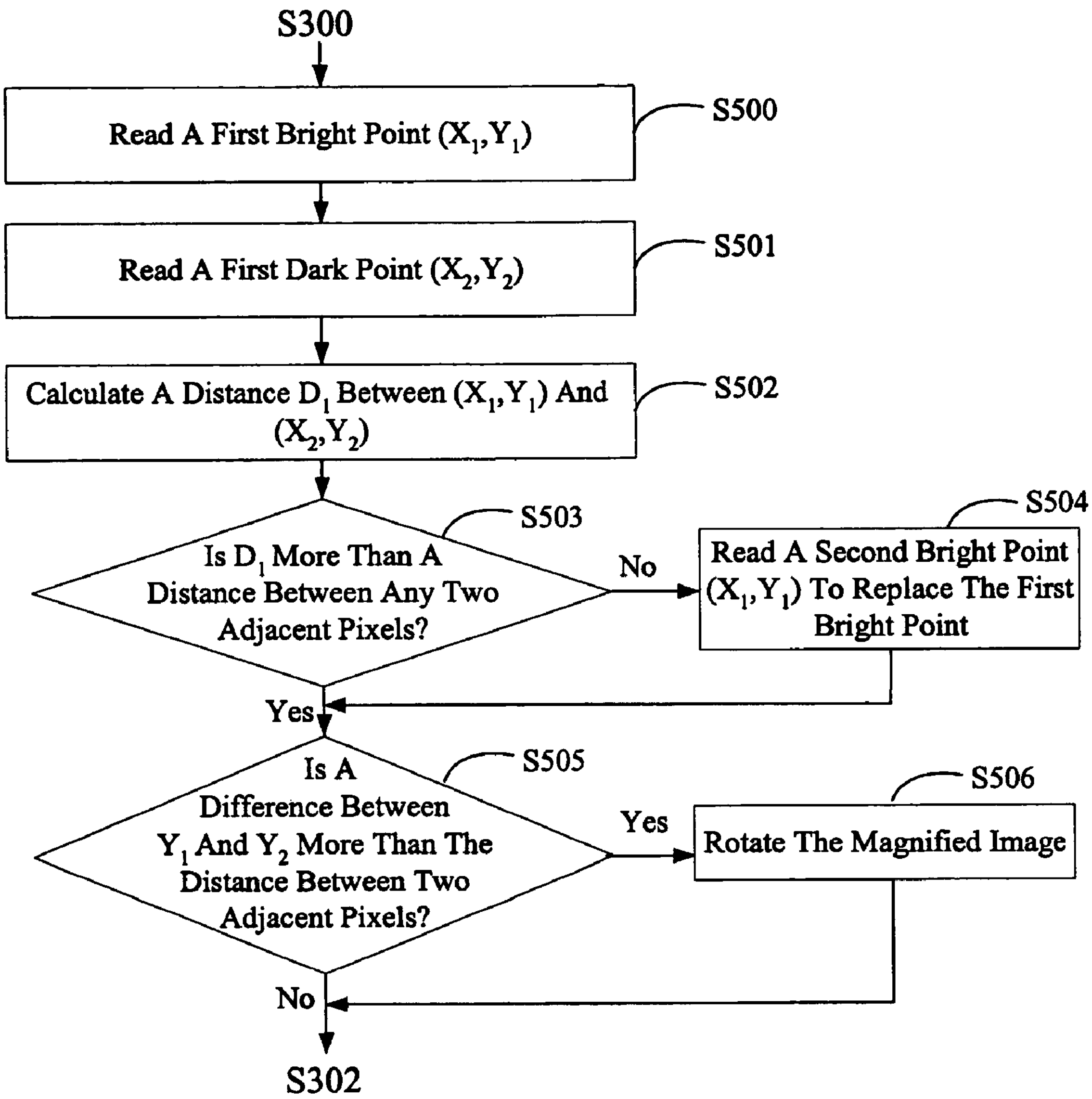
FIG. 5 is a flowchart of implementing a second step of FIG. 3, namely processing a magnified image of the LCD panel.

FIG. 5 is a flowchart of implementing step S301 of FIG. 3, namely processing the magnified image of the inspected LCD panel 10. Generally, if a part of an image is gradient, it is concluded that the whole image is gradient. Therefore, in the preferred embodiment, a top left corner of the magnified image (hereinafter, "the part image") is taken to determine whether the whole image is gradient and needs to be rotated. In step S500, the CPU reads image pixels from the memory according to a first sequence. The first sequence means reading the image pixels from the top right corner of the part image to the left edge of the part image horizontally. The CPU reads the image pixels until a first bright point $(X_1, Y_1)$ described in Cartesian coordinates is obtained. The first bright point is a pixel of which a color value of each of the three sub-pixels is more than 100. In step S501, the CPU reads the image pixels from the memory according to a second sequence. The second sequence means reading the image pixels from the bottom right corner of the part image to the top edge of the part image vertically. The CPU reads the image pixels until a first dark point $(X_2, Y_2)$ described in Cartesian coordinates is obtained. The first dark point is a pixel of which a color value of each of the three sub-pixels is less than 100. In step S502, the CPU calculates a distance $D_1$ between the first bright point $(X_1, Y_1)$ and the first dark point $(X_2, Y_2)$. In step S503, the CPU determines whether $D_1$ is more than a distance between any two adjacent pixels. If $D_1$ is more than the distance between two adjacent pixels, the procedure goes to step S505 described below. If $D_1$ is not more than the distance between two adjacent pixels, in step S504, the CPU reads the image pixels from the memory according to a third sequence. The third sequence means reading the image pixels from the top left corner of the part image to the bottom edge of the part image vertically. The CPU reads the image pixels until a second bright point is obtained. Coordinates of the second bright point replace those of the first bright point, and are designated as $(X_1, Y_1)$. In step S505, the CPU determines whether a difference between $Y_1$ and $Y_2$ is more than the distance between two adjacent pixels. If the difference is more than the distance between two adjacent pixels, in step S506, the CPU rotates the magnified image according to a slope of an absolute value of a ratio of $(Y_2-Y_1)$ to $(X_2-X_1)$. If the difference is not more than the distance between two adjacent pixels, the procedure goes directly to S302 described above.

Figure 6:
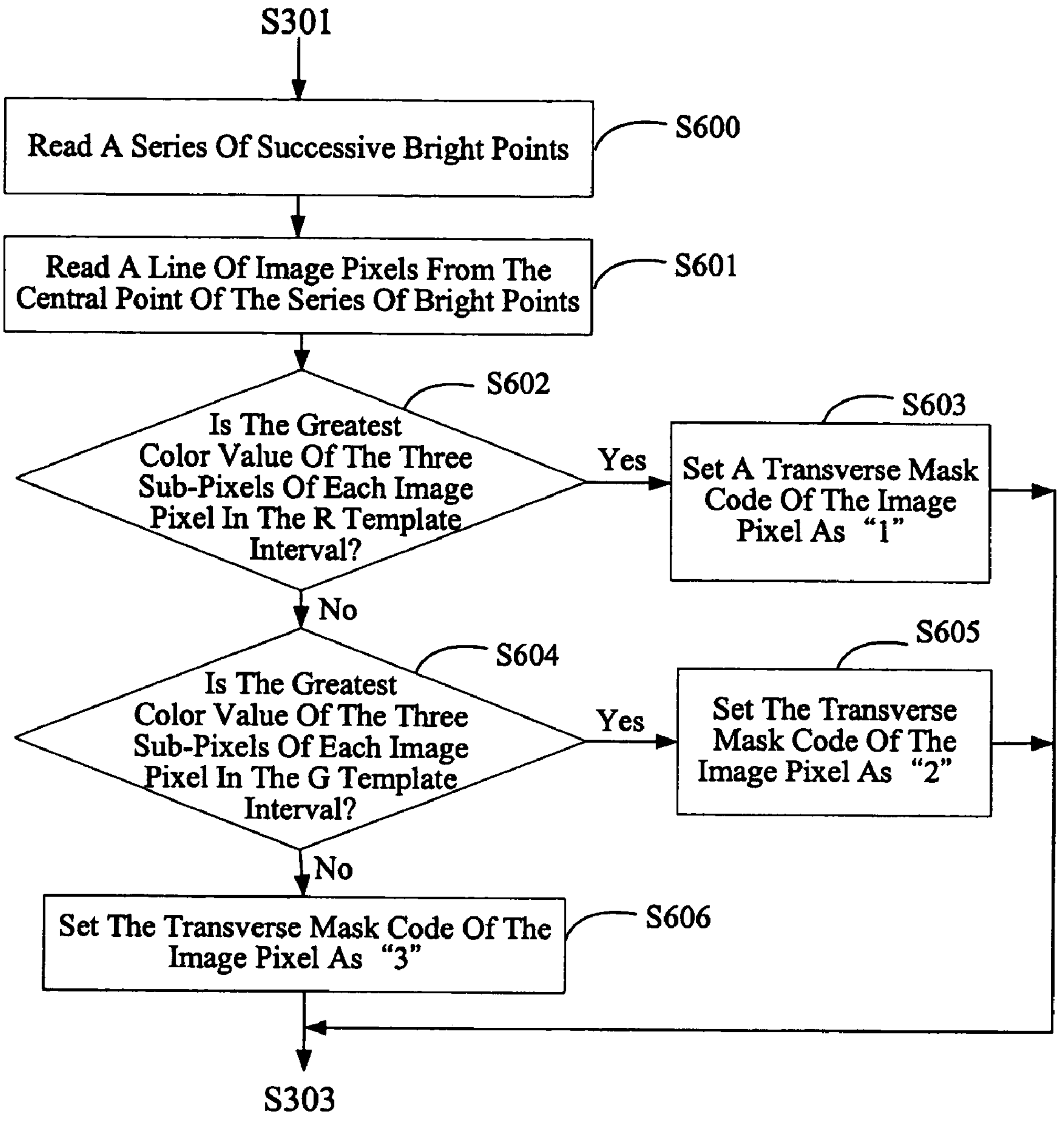
FIG. 6 is a flowchart of implementing a third step of FIG. 3, namely obtaining transverse mask codes of image pixels.

FIG. 6 is a flowchart of implementing step S302 of FIG. 3, namely obtaining transverse mask codes of image pixels of the processed image. In step S600, the CPU reads the image pixels from the memory according to a fourth sequence. The fourth sequence means reading the image pixels from the bottom left corner of the processed image of the inspected LCD panel to the top edge of the processed image vertically. In step S601, the CPU reads the image pixels until a series of successive bright points is obtained. Then, the CPU reads a line of image pixels from a central point of the series of bright points to a right edge of the processed image horizontally. In step S602, the CPU determines whether the greatest color value of the three sub-pixels of each image pixel in the line is in the red template interval. If the greatest color value is in the red template interval, in step S603, the CPU sets the transverse mask code of the image pixel as "1." If the greatest color value is not in the red template interval, in step S604, the CPU determines whether the greatest color value of the three sub-pixels of the image pixel is in the green template interval. If the greatest color value is in the green template interval, in step S605, the CPU sets the transverse mask code of the image pixel as "2." If the greatest color value is not in the green template interval, in step S606, the CPU sets the transverse mask code of the image pixel as "3," meaning that the greatest color value of the three sub-pixels of the image pixel is in the blue template interval.

Figure 7:
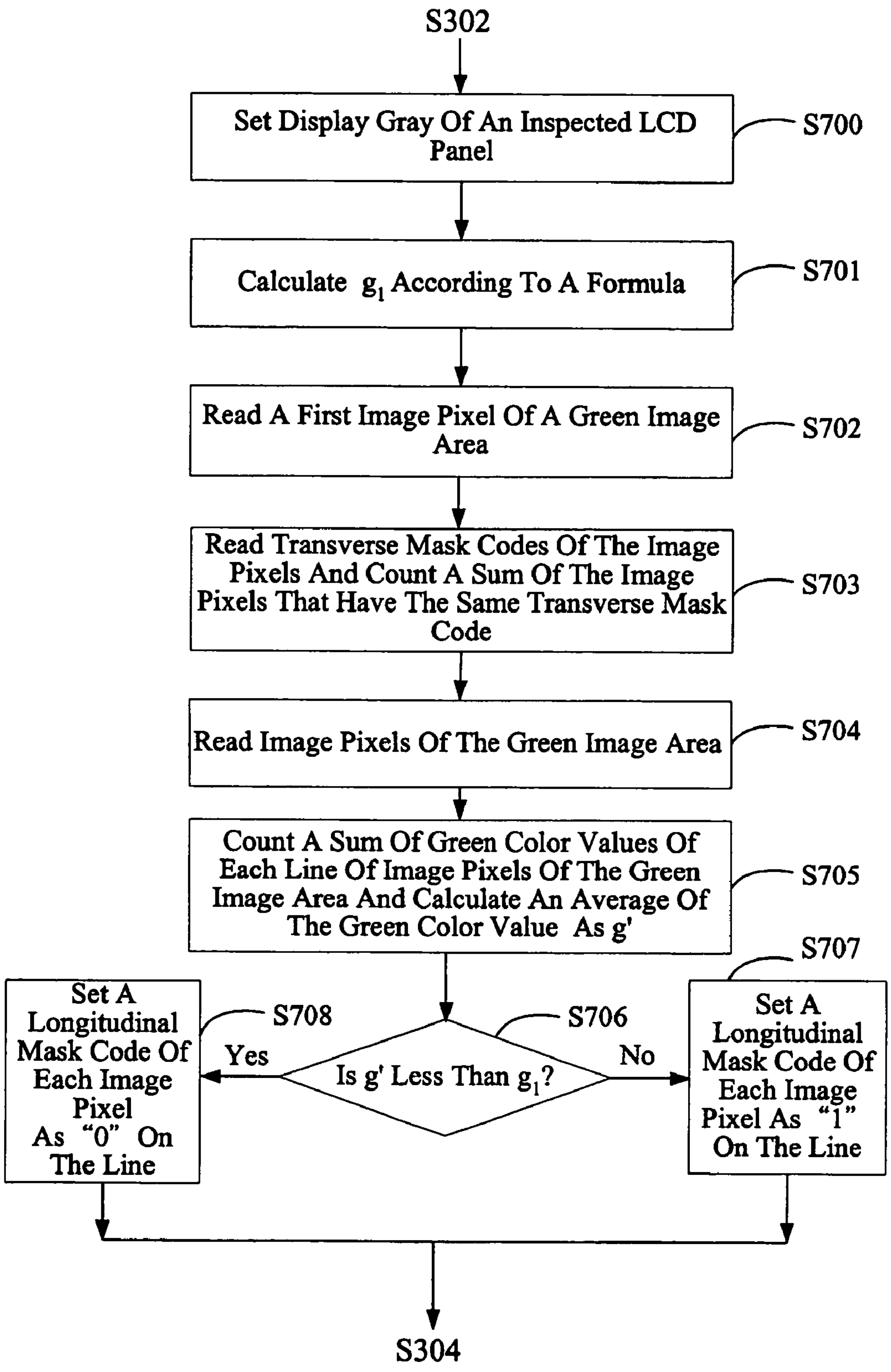
FIG. 7 is a flowchart of implementing a fourth step of FIG. 3, namely obtaining longitudinal mask codes of image pixels.

FIG. 7 is a flowchart of implementing step S303 of FIG. 3, namely obtaining longitudinal mask codes of image pixels. In step S700, an operator sets a suitable brightness of the inspected LCD panel. Because green is generally the brightest color to the human eye among all the display colors, in the preferred embodiment, green is used to illustrate this procedure. In step S701, the CPU calculates a $g_1$ value according to the formula: $g_1$=(the greatest color value of the green template interval $(X'_2)$−the least color value of the green template interval $(X'_1)$)*q %+the least color value of the green template interval. The "q" is a variable and can be adjusted according to inspection requirements. In step S702, the CPU reads image pixels from the memory according to a fifth sequence. The fifth sequence means reading the image pixels from a midpoint of the top line of the processed image to the right edge of the processed image horizontally. The CPU reads the image pixels until a first image pixel displaying green is obtained, meaning that the greatest color value of three sub-pixels of the image pixel is green, and that the first image pixel is the first point of a green image area. The green image area consists of a plurality of image pixels displaying green. Then, the CPU goes on reading other image pixels following the first image pixel to the right edge of the processed image until reaching another green image area. In step S703, the CPU reads corresponding transverse mask codes of the image pixels, including image pixels displaying green, blue and red. The CPU counts a sum "n" of the image pixels that have the same transverse mask code, and regards the sum "n" as a color width. In step S704, the CPU reads image pixels in the green image area from the top edge to the bottom edge of the green image area. In step S705, the CPU counts a sum of green color values of each row of image pixels of the green image area, and calculates an average of the green color values of each row, which is designated as g'. In step S706, the CPU determines whether g' of each row of image pixels is less than $g_1$. If g' of the row is less than $g_1$, in step S707, the CPU sets a longitudinal mask code of each image pixel on the row as "0," and regards the row as a black edge. If g' of row is not less than $g_1$, in step S708, the CPU sets a longitudinal mask code of each image pixel on the row as "1," and regards the row as a non-black edge.

Figure 8:
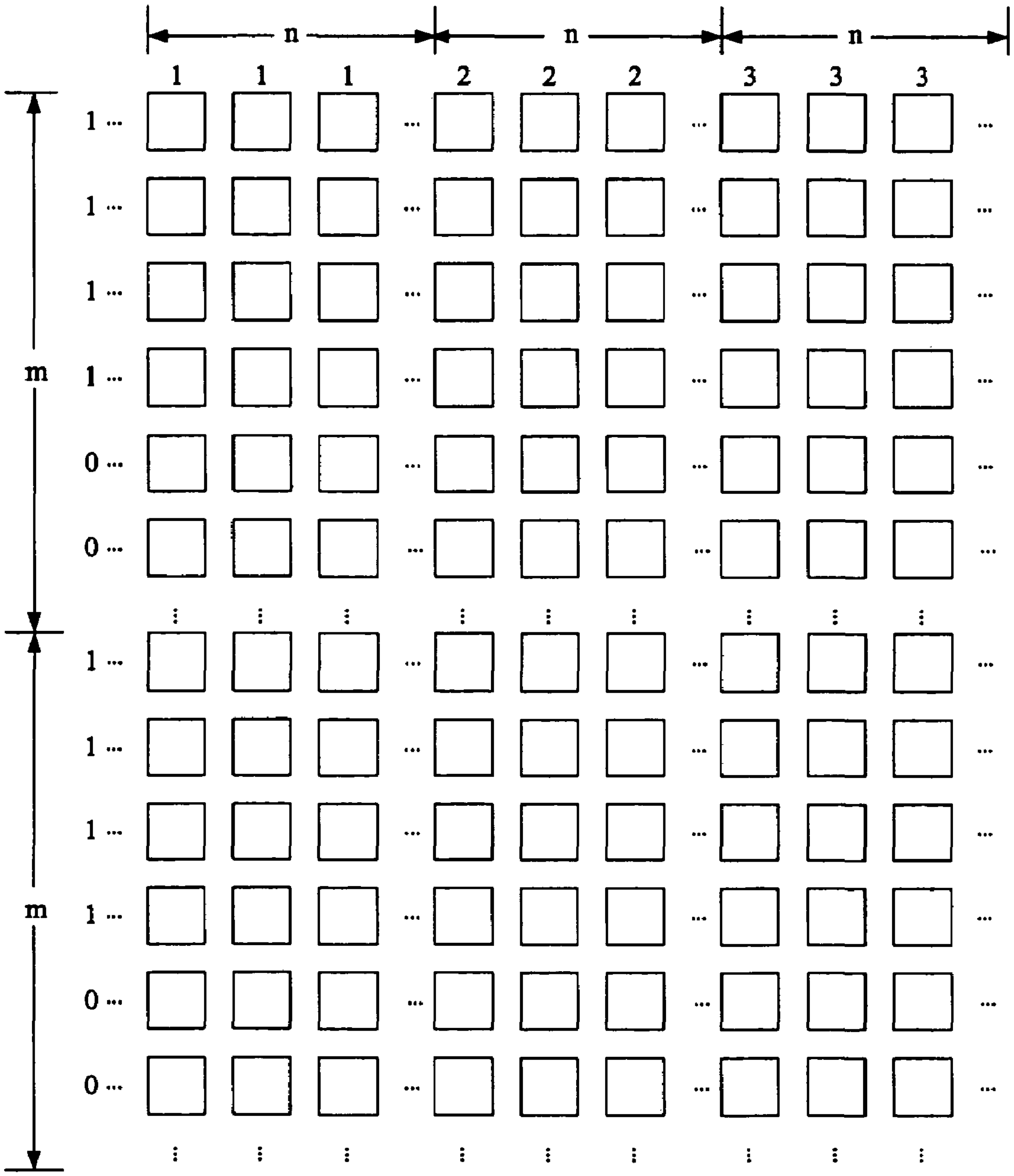
FIG. 8 illustrates the transverse mask codes and the longitudinal mask codes generated by performing the procedures in FIG. 6 and FIG. 7 respectively.

FIG. 8 illustrates the transverse mask codes and the longitudinal mask codes generated by performing the procedures in FIG. 6 and FIG. 7 respectively. Each grid (box) in FIG. 8 represents a magnified image pixel. The letter "n" represents a transverse width of an image area, namely a color width. The letter "m" represents a longitudinal length of the image area from a first longitudinal mask code "1" to a last longitudinal mask code "0" before another longitudinal mask code "1." Each n times m of the grids arrayed in a matrix form represents the image area. The matrixes with transverse mask codes "1", "2" and "3" respectively represent a red image area, a green image area, and a blue image area. Each matrix, which contains n×m magnified image pixels, corresponds to a sub-pixel of an image pixel of the inspected LCD panel (i.e., a red sub-pixel, or a green sub-pixel, or a blue sub-pixel).

Figure 9:
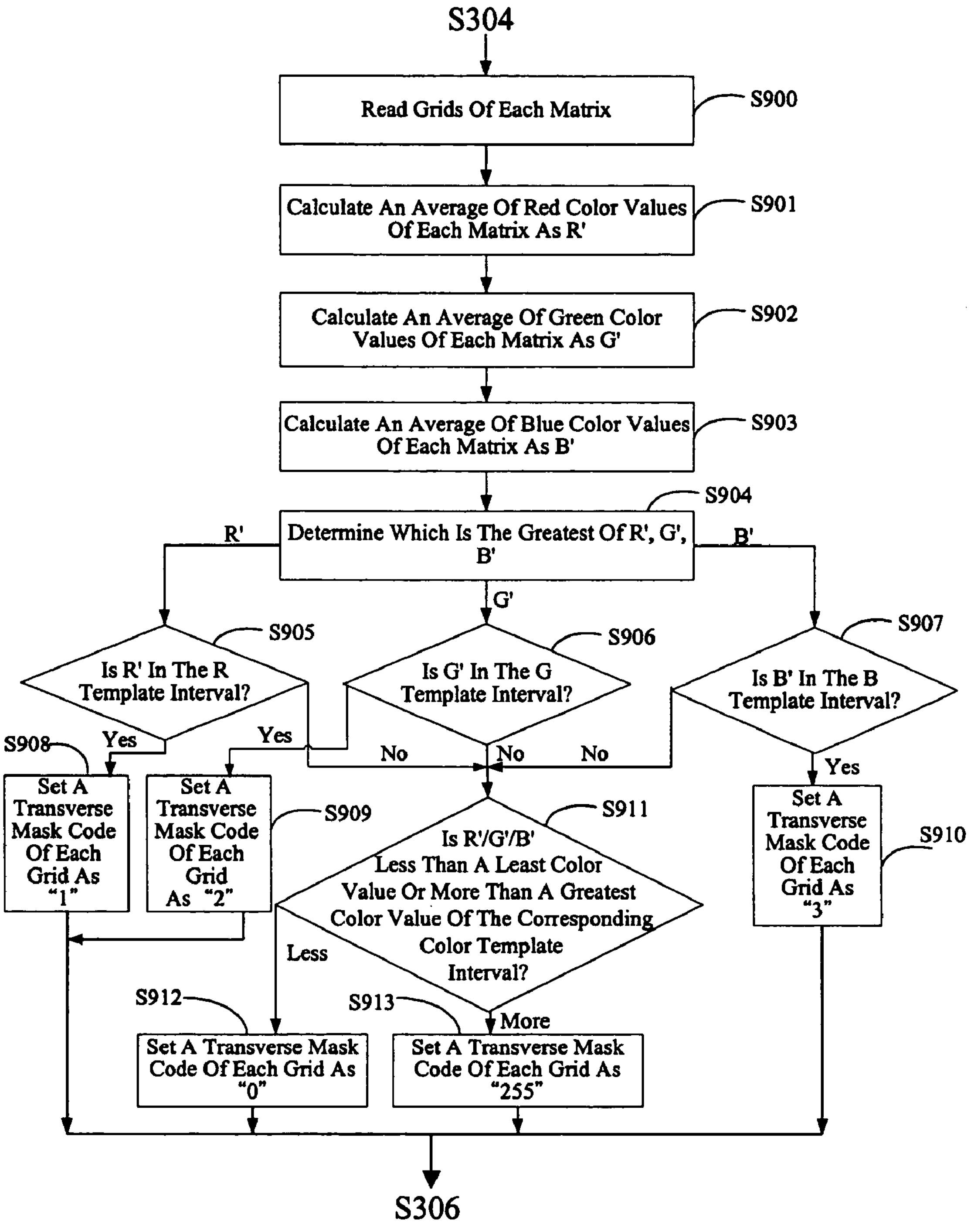
FIG. 9 is a flowchart of implementing a sixth step of FIG. 3, namely obtaining a color transverse mask code matrix of sub-pixels of the LCD panel.

FIG. 9 is a flowchart of implementing step S305 of FIG. 3, namely obtaining a color transverse mask code matrix of sub-pixels of the inspected LCD panel 10. In step S900, the CPU reads grids of each matrix from the memory. Each grid represents a magnified image pixel. In step S901, the CPU calculates an average of red color values of each matrix in which the longitudinal mask codes of the grids are "1," and designates the calculated average as R'. In step S902, the CPU calculates an average of green color values of each matrix in which the longitudinal mask codes of the grids are "1," and designates the calculated average as G'. In step S903, the CPU calculates an average of blue color values of each matrix in which the longitudinal mask codes of the grids are "1," and designates the calculated average as B'. In step S904, the CPU determines which is the greatest of R', G', and B'. If R' is the greatest, in step S905, the CPU determines whether R' is in the red template interval. If R' is in the red template interval, the procedure goes to step S908 described below. In contrast, if R' is not in the red template interval, the procedure goes to step S911 described below. If G' is the greatest of R', G', and B', in step S906, the CPU determines whether G' is in the green template interval. If G' is in the green template interval, the procedure goes to step S909 described below. In contrast, if G' is not in the green template interval, the procedure goes to step S911 described below. If B' is the greatest of R', G', and B', in step S907, the CPU determines whether B' is in the blue template interval. If B' is in the blue template interval, the procedure goes to step S910 described below. In contrast, if B' is not in the blue template interval, the procedure goes to step S911 described below.

In step S908, the CPU sets a transverse mask code of each grid of a corresponding matrix as "1," and regards a color transverse mask code of the matrix, namely a sub-pixel of a corresponding image pixel of the inspected LCD panel, as "1." In step S909, the CPU sets a transverse mask code of each grid of a corresponding matrix as "2," and regards a color transverse mask code of the matrix, namely a sub-pixel of a corresponding image pixel of the inspected LCD panel, as "2." In step S910, the CPU sets a transverse mask code of each grid of a corresponding matrix as "3," and regards a color transverse mask code of the matrix, namely a sub-pixel of a corresponding pixel of the inspected LCD panel, as "3." In step S911, the CPU determines whether the greatest of R', G', or B' (whichever is applicable) is less than a least color value of a corresponding color template interval, or more than a greatest color value of the corresponding color template interval. If the greatest of R', G', and B' is less than the least color value of the corresponding color template interval, in step S912, the CPU sets a color transverse mask code of each grid of a corresponding matrix as "0," and regards a color transverse mask code of the matrix, namely a sub-pixel of a corresponding image pixel of the inspected LCD panel, as "0." If the greatest of R', G', and B' is more than the greatest color value of the corresponding color template interval, in step S913, the CPU sets a color transverse mask code of each grid of a corresponding matrix as "255," and regards a color transverse mask code of the matrix, namely a sub-pixel of a corresponding pixel of the inspected LCD panel, as "255."

Figure 10:
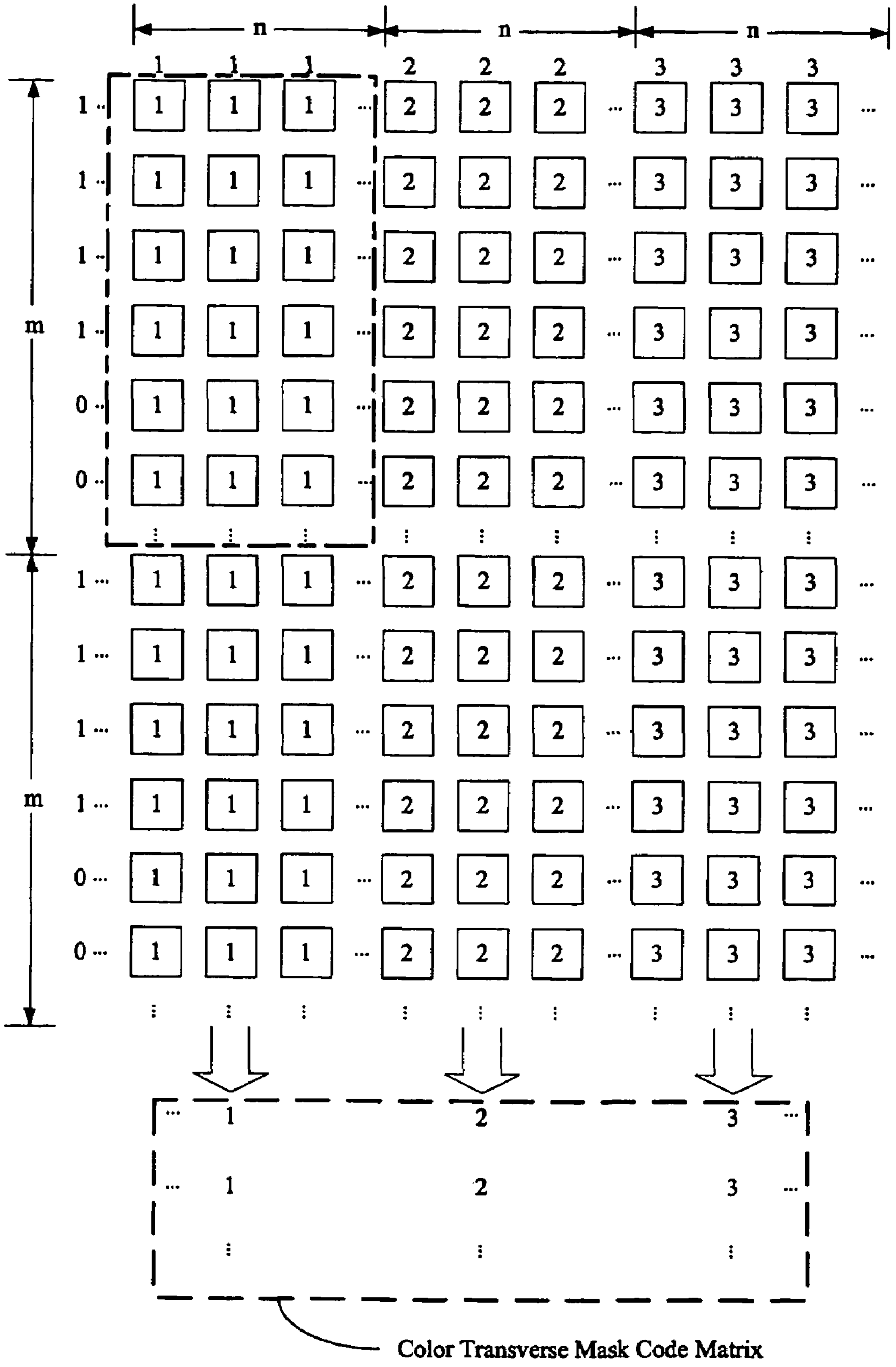
FIG. 10 illustrates the color transverse mask code matrix generated by performing the procedure in FIG. 9, but not showing codes “0” or codes “255;”

FIG. 10 illustrates the color transverse mask code matrix generated by performing the procedures in FIG. 9, but not showing the codes "0" and "255." Each n times m of grids (boxes) arrayed in a matrix form represents a sub-pixel of an image pixel of the inspected LCD panel (i.e., a red sub-pixel, or a green sub-pixel, or a blue sub-pixel).

Figure 11:
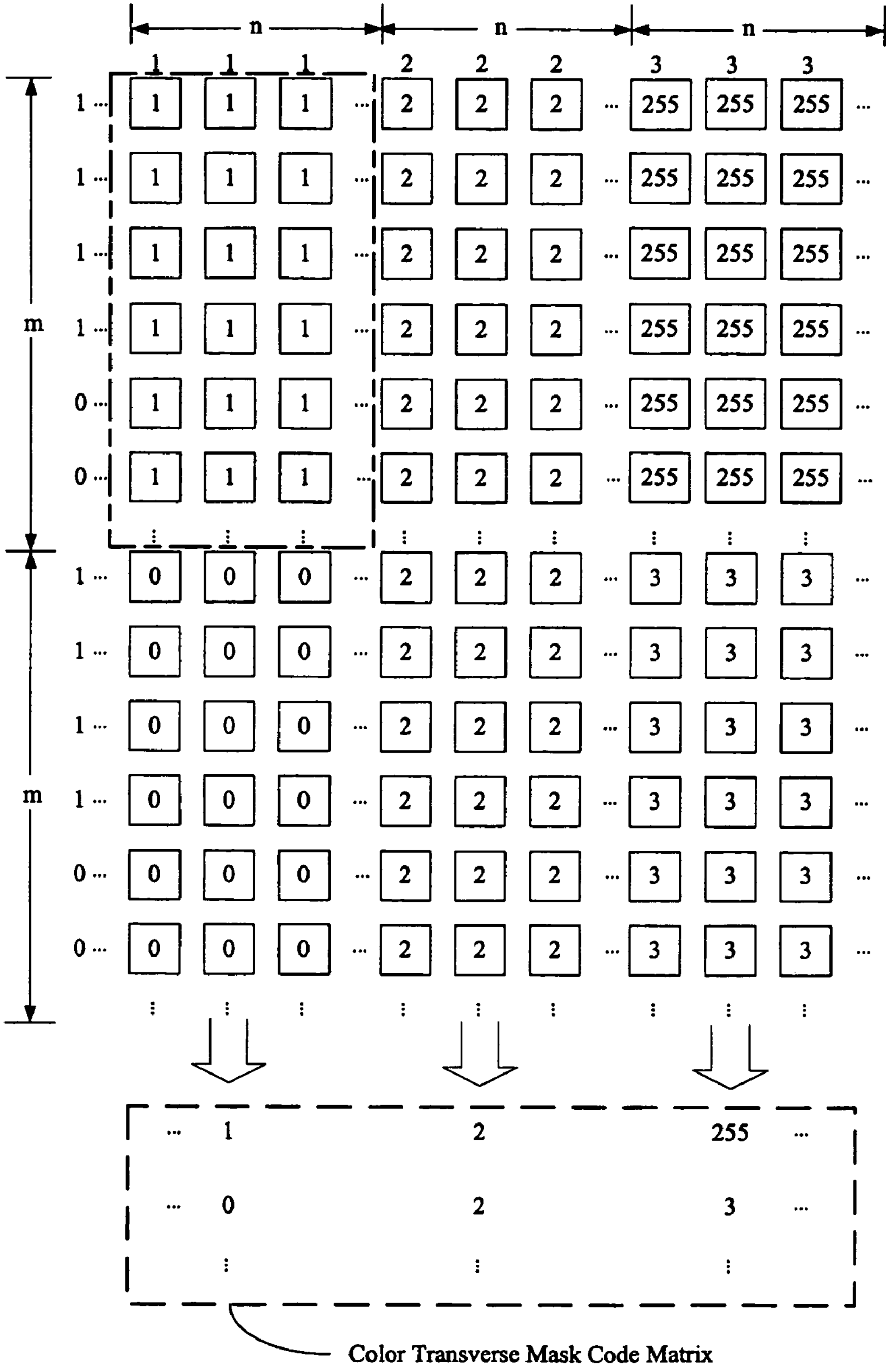
FIG. 11 illustrates the color transverse mask code matrix generated by performing the procedure in FIG. 9, and showing codes "0" and codes "255.

FIG. 11 illustrates the color transverse mask code matrix generated by performing the procedures in FIG. 9, and showing the codes "0" and "255."

Figure 12:
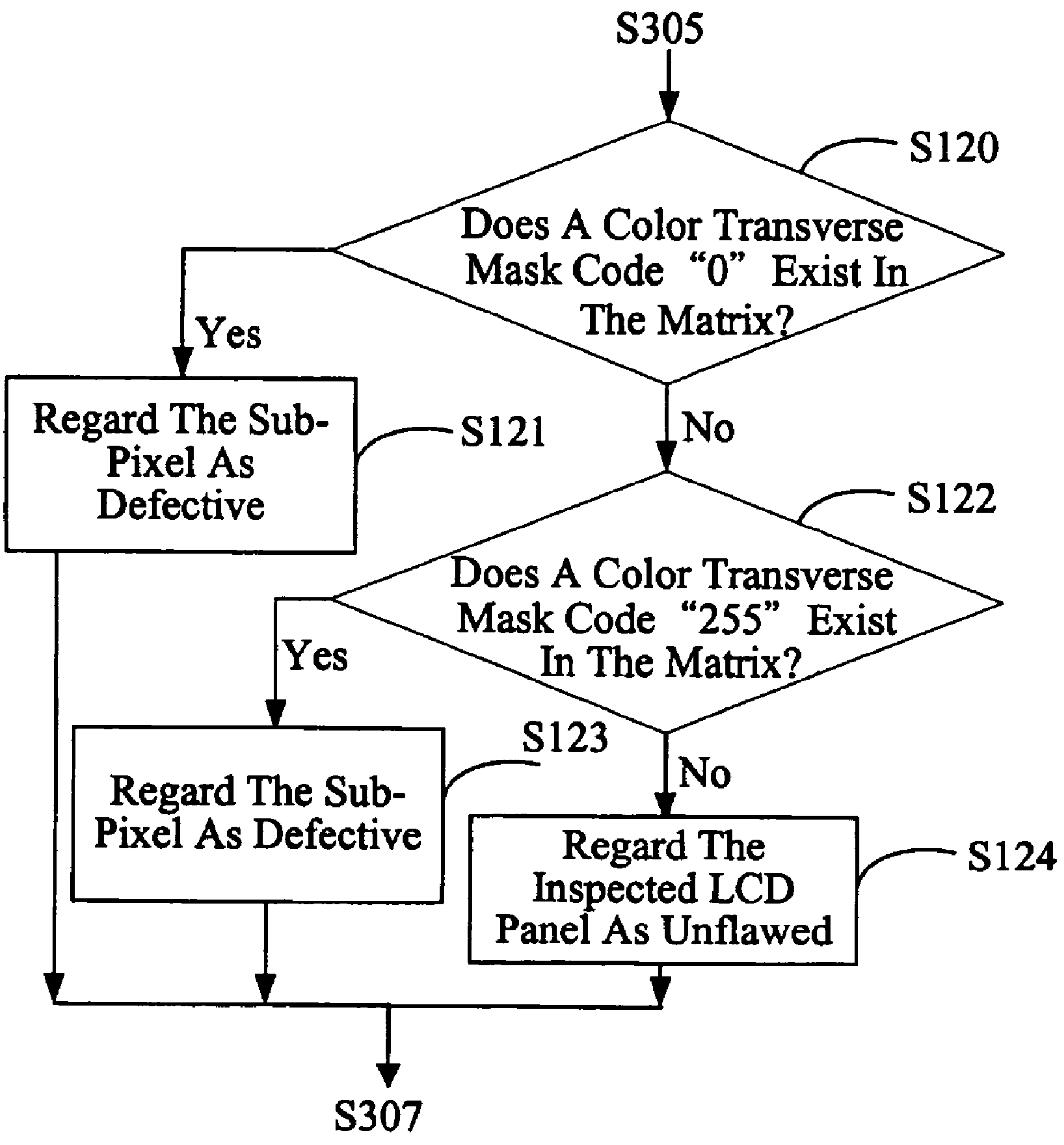
" and FIG. 12 is a flowchart of implementing a seventh step of FIG. 3, namely determining whether the color transverse mask code matrix includes any code "0" or code "255."

FIG. 12 is a flowchart of implementing step S306 of FIG. 3, namely determining whether the color transverse mask code matrix includes any code "0" or code "255." In step S120, the CPU determines whether a color transverse mask code "0" exists in the color transverse mask code matrix. If a color transverse mask code "0" exists in the color transverse mask code matrix, in step S121, the CPU marks (i.e., flags) that a corresponding sub-pixel of the inspected LCD panel is a black point, and regards the sub-pixel as defective. If no color transverse mask code "0" exists in the color transverse mask code matrix, in step S122, the CPU determines whether a color transverse mask code "255" exists in the color transverse mask code matrix. If a color transverse mask code "255" exists in the color transverse mask code matrix, in step S123, the CPU marks (i.e., flags) that a corresponding sub-pixel of the inspected LCD panel is a bright point, and regards the sub-pixel as defective. If no color transverse mask code "255" exists in the color transverse mask code matrix, in step S124, the CPU regards the inspected LCD panel as unflawed.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for inspecting a liquid crystal display (LCD) panel, comprising:

a magnifier for magnifying an image of the inspected LCD panel;

a charge coupled device (CCD) camera for capturing the magnified image of the inspected LCD panel;

an image acquisition card for converting analog signals of the magnified image into digital signals; and a computer, comprising:

a memory for storing the magnified image; and a central processing unit (CPU) for:

obtaining color template intervals based on a statistical theory;

rotating the magnified image according to a slope when necessary;

obtaining transverse mask codes and longitudinal mask codes of magnified image pixels according to the color template intervals;

obtaining a color transverse mask code matrix of sub-pixels of the inspected LCD panel according to the color template intervals, the transverse mask codes and the longitudinal mask codes; and determining whether the sub-pixels of the inspected LCD panel are defective according to the color transverse mask code matrix.

2. The system for inspecting an LCD panel according to claim 1, wherein the CPU is further for obtaining an amount distribution histogram of color values of each sub-pixel, based on the statistical theory.

3. The system for inspecting an LCD panel according to claim 2, wherein the CPU is further for selecting a color value with the greatest amount from the amount distribution histogram of a type of sub-pixel, setting the color value as a central point $X_0$, and respectively selecting a color value not being zero from the leftmost point and from the rightmost point of the amount distribution histogram, correspondingly regarding the color value as a left point $X_1$ and a right point $X_2$, reading an $X'_1$ and an $X'_2$ from the color values of the sub-pixel respectively from the intervals of $X_0$ to $X_1$ and $X_0$ to $X_2$ until a ratio of $(X_0-X'_1)$ to $(X'_2-X_0)$ equals p % of a ratio of $(X_0-X_1)$ to $(X_2-X_0)$, and regarding the interval $(X'_1, X'_2)$ as a color template interval, wherein the item p is a variable.

4. The system for inspecting an LCD panel according to claim 1, wherein the CPU is further for:

reading image pixels from a top right corner of a top left corner part of the magnified image to a left edge of the top left corner part of the magnified image horizontally until a first bright point $(X_1, Y_1)$ is obtained, wherein the first bright point is a pixel of which a color value of each of three sub-pixels is more than 100;

reading image pixels from a bottom right corner of the top left corner part of the magnified image to a top edge of the top left corner part of the magnified image vertically until a first dark point $(X_2, Y_2)$ is obtained, wherein the first dark point is a pixel of which a color value of each of the three sub-pixels is less than 100;

calculating a distance $D_1$ between the first bright point and the first dark point;

determining whether $D_1$ is more than a distance between two adjacent pixels;

reading image pixels from a top left corner of the top left corner part of the magnified image to a bottom edge of the top left corner part of the magnified image vertically until a second bright point $(X_1, Y_1)$ replacing the first bright point is obtained, if $D_1$ is less than the distance between two adjacent pixels;

determining whether a difference between $Y_1$ and $Y_2$ is more than the distance between two adjacent pixels; and rotating the magnified image according to a slope of an absolute value of a ratio of $(Y_2-Y_1)$ to $(X_2-X_1)$, if the difference between $Y_1$ and $Y_2$ is more than the distance between two pixels.

5. The system for inspecting an LCD panel according to claim 1, wherein the color transverse mask codes comprise "0" or "255."

6. The system for inspecting an LCD panel according to claim 1, wherein the CPU regards the inspected LCD panel as defective if one or more color transverse mask codes "0" or "255" exist.

7. A method for inspecting an LCD panel, comprising the steps of:

obtaining color template intervals, comprising:

capturing images of a plurality of unflawed LCD panels; and obtaining amount distribution histogram of color values of each sub-pixel, based on a statistical theory;

processing a magnified image of the inspected LCD panel according to a slope;

obtaining transverse mask codes of image pixels of a processed image, according to the color template intervals and the color values;

obtaining longitudinal mask codes of the image pixels of the processed image, according to the color template intervals and color values of a selected color of the image pixels, wherein the selected color is green, blue, or red;

trimming off four edges of the processed image;

obtaining a color transverse mask code matrix of sub-pixels of the inspected LCD panel, according to the color template intervals, the transverse mask codes and the longitudinal mask codes;

determining whether one or more color transverse mask codes "0" or "255" exist in the color transverse mask code matrix; and marking one or more corresponding sub-pixels of the inspected LCD panel, and regarding the one or more corresponding sub-pixels as defective, if one or more color transverse mask codes "0" or "255" exist in the color transverse mask code matrix.

8. The method according to claim 7, wherein the step of obtaining color template intervals further comprises the steps of:

regarding a color value with the greatest amount of an amount distribution histogram as a central point $X_0$;

regarding a color value not being zero from a leftmost point of the amount distribution histogram as a left point $X_1$;

regarding a color value not being zero from a rightmost point of the amount distribution histogram as a right point $X_2$; and reading an $X'_1$ and an $X'_2$ from the color values of the amount distribution histogram respectively from the intervals of $X_0$ to $X_1$ and $X_0$ to $X_2$ until a ratio of $(X_0-X'_1)$ to $(X'_2-X_0)$ meets a preset percentage of a ratio of $(X_0-X_1)$ to $(X_2-X_0)$.

9. The method according to claim 7, wherein the step of processing a magnified image of the inspected LCD panel according to a slope further comprises the steps of:

reading image pixels from a top right corner of a magnified image to a left edge of the magnified image horizontally until a first bright point $(X_1, Y_1)$ is obtained, wherein the first bright point is a pixel of which a color value of each of three sub-pixels is more than 100;

reading image pixels from a bottom right corner of the magnified image to a top edge of the magnified image vertically until a first dark point $(X_2, Y_2)$ is obtained, wherein the first dark point is a pixel of which a color value of each of three sub-pixels is less than 100;

calculating a distance $D_1$ between the first bright point and the first dark point;

determining whether $D_1$ is more than a distance between two adjacent pixels;

reading image pixels from a top left corner of the magnified image to a bottom edge of the magnified image vertically until a second bright point $(X_1, Y_1)$ replacing the first bright point is obtained, if $D_1$ is less than the distance between two adjacent pixels;

determining whether a difference between $Y_1$, and $Y_2$ is more than the distance between two adjacent pixels; and rotating the magnified image according to a slope of an absolute value of a ratio of $(Y_2-Y_1)$ to $(X_2-X_1)$, if the difference between $Y_{1\ and\ Y2}$ is more than the distance between two adjacent pixels.

10. The method according to claim 7, wherein the step of obtaining transverse mask codes of image pixels of a processed image further comprises the steps of:

reading image pixels from a bottom left corner of the processed image to a top edge of the processed image vertically until a series of successive bright points is obtained;

reading a line of image pixels from a central point of the series of bright points to a right edge of the processed image horizontally;

setting a transverse mask code of the image pixel as "1," if a greatest color value of three sub-pixels of the image pixel is in a red template interval;

setting a transverse mask code of the image pixel as "2," if a greatest color value of three sub-pixels of the image pixel is in a green template interval; and setting a transverse mask code of the image pixel as "3," if a greatest color value of three sub-pixels of the image pixel is in a blue template interval.

11. The method according to claim 7, wherein the step of obtaining longitudinal mask codes of the image pixels of the processed image further comprises the steps of:

reading image pixels from a midpoint of the top line of the processed image to a right edge of the processed image horizontally until a first image pixel displaying the selected color is obtained, wherein the first image pixel is a first point of an image area of the selected color;

reading other image pixels following the first image pixel to the right edge of the processed image until reaching another image area of the selected color;

reading image pixels in the image area of the selected color from a top edge to a bottom edge of the image area of the selected color;

counting a sum of color values of the selected color of each row of image pixels of the image area of the selected color, and calculating an average of the color values of the selected color of each row; and setting a longitudinal mask code of each image pixel on the row as "0," if the calculated average is less than a preset value;

or setting a longitudinal mask code of each image pixel on the row as "1," if the calculated average is not less than the preset value.

12. The method according to claim 7, wherein the step of obtaining a color transverse mask code matrix of sub-pixels of the inspected LCD panel further comprises the steps of:

calculating an average of red color values of each matrix in which the longitudinal mask codes of the grids are "1" and designating the calculated average as R';

calculating an average of green color values of each matrix in which the longitudinal mask codes of the grids are "2" and designating the calculated average as G';

calculating an average of blue color values of each matrix in which the longitudinal mask codes of the grids are "3" and designating the calculated average as B';

setting a transverse mask code of each grid of a corresponding matrix as "1," and regarding a color transverse mask code of the matrix, namely a sub-pixel of a corresponding image pixel of the inspected LCD panel, as "1," if R' is the greatest of R', G', and B', and is in an R template interval;

setting a transverse mask code of each grid of a corresponding matrix as "2," and regarding a color transverse mask code of the matrix, namely a sub-pixel of a corresponding image pixel of the inspected LCD panel, as "2", if G' is the greatest of R', G', and B', and is in a G template interval;

setting a transverse mask code of each grid of a corresponding matrix as "3," and regarding a color transverse mask code of the matrix, namely a sub-pixel of a corresponding image pixel of the inspected LCD panel, as "3," if B' is the greatest of R', G', and B', and is in a B template interval;

setting a transverse mask code of each grid of a corresponding matrix as "0," and regarding a color transverse mask code of the matrix, namely a sub-pixel of a corresponding image pixel of the inspected LCD panel, as "0," if the greatest of R', G', and B' is less than a least color value of a corresponding color template interval; and setting a transverse mask code of each grid of a corresponding matrix as "255," and regarding a color transverse mask code of the matrix, namely a sub-pixel of a corresponding image pixel of the inspected LCD panel, as "255," if the greatest of R', G', and B' is more than a greatest color value of a corresponding color template interval.

13. The method according to claim 12, wherein each matrix corresponds to a sub-pixel of an image pixel of the inspected LCD panel.

14. The method according to claim 7, further comprising the step of: regarding the sub-pixel of the inspected LCD panel as defective, if the color transverse mask code of the sub-pixel of the image pixel of the inspected LCD panel is "0".

15. The method according to claim 7, further comprising the step of: regarding the sub-pixel of the inspected LCD panel as defective, if the color transverse mask code of the sub-pixel of the image pixel of the inspected LCD panel is "255".

16. A method for inspecting an LCD panel, comprising the steps of:

taking magnifying images of a plurality of unflawed LCD panels;

obtaining color template intervals by analyzing statistically said images of said unflawed LCD panels;

taking an magnifying image of said LCD panel for inspecting;

modifying said image of said LCD panel by analyzing said image of said LCD panel;

obtaining a color transverse mask code matrix for every sub-pixel of said LCD panel by analyzing said image of said LCD panel and comparing said every sub-pixel with said color template intervals; and marking said every sub-pixel of said LCD panel as one of unflawed and defective by detecting a corresponding value thereof in said color transverse mask code matrix.

17. The method according to claim 16, wherein said modifying step further comprises trimming said image of said LCD panel and rotating said image of said LCD panel.

18. The method according to claim 16, further comprising the step of obtaining transverse mask codes and longitudinal mask codes of said image of said LCD panel by analyzing said image of said LCD panel before said obtaining step for said color transverse mask code matrix.

* * * * *